(No Model.) 2 Sheets—Sheet 2.

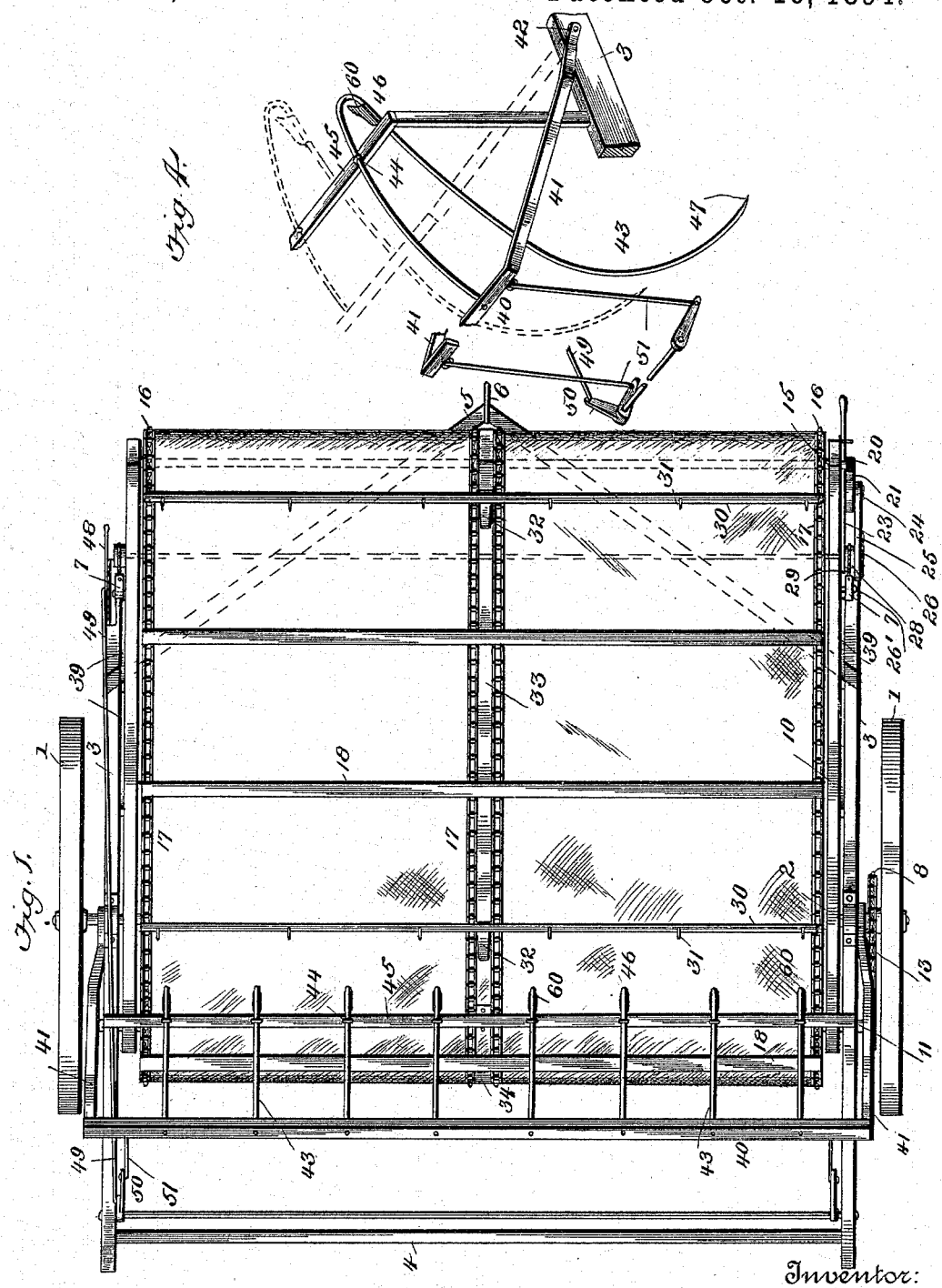

A. L. RICE.
HAY LOADER.

No. 527,510. Patented Oct. 16, 1894.

Witnesses:

Inventor:
Abraham L. Rice,
by Collamer & Co.,
Attorneys.

UNITED STATES PATENT OFFICE.

ABRAHAM LINCOLN RICE, OF WRIGHT, IOWA.

HAY-LOADER.

SPECIFICATION forming part of Letters Patent No. 527,510, dated October 16, 1894.

Application filed December 21, 1893. Serial No. 494,277. (No model.)

*To all whom it may concern:*

Be it known that I, ABRAHAM LINCOLN RICE, a citizen of the United States, residing at Wright, in the county of Mahaska and State of Iowa, have invented certain new and useful Improvements in Hay-Loaders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to hay loaders, and more especially to that class thereof employing endless belts; and the object of the same is to effect certain improvements in the mounting and pivoting of the teeth, the means for adjusting the angle of the elevator, and other details.

To this end the invention consists in a machine embodying substantially the construction hereinafter more fully described and claimed, and as illustrated in the accompanying drawings, wherein—

Figure 3:
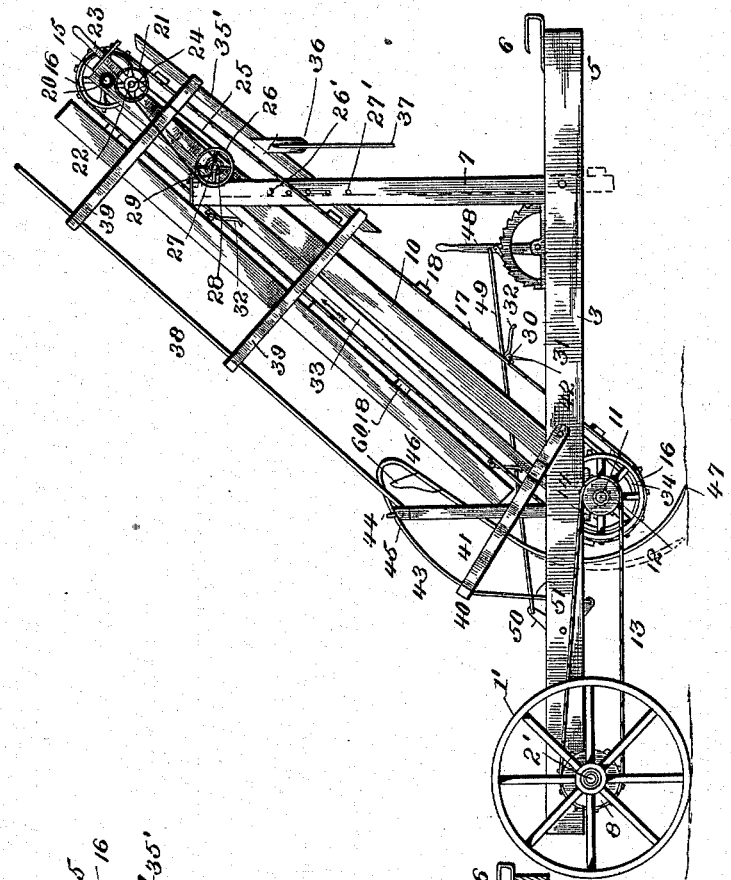
Figure 2:
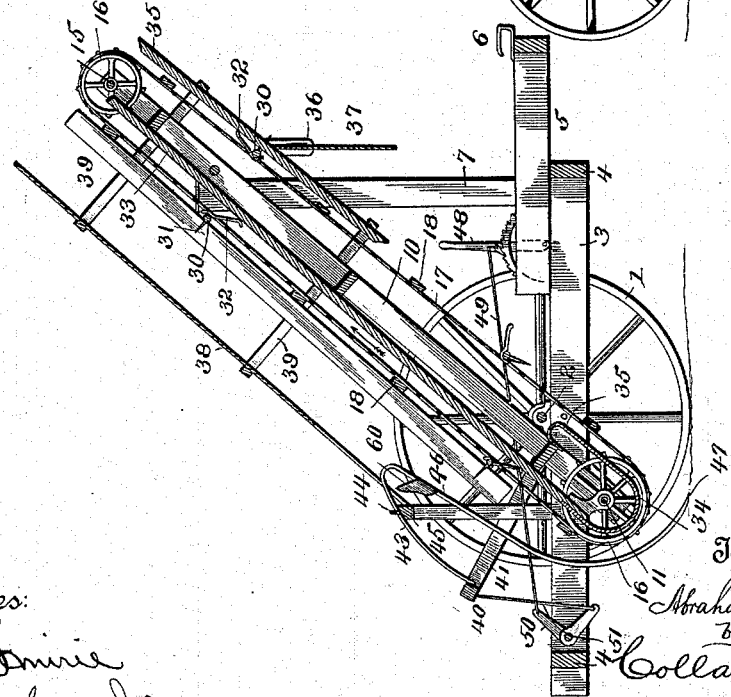

Figure 1 is a plan view with the cover removed and certain parts broken away. Fig. 2 is a central longitudinal section. Fig. 3 is a right side elevation showing the supporting wheels as connected with the framework in rear of the elevator. Fig. 4 is an enlarged perspective detail of the rake head, the rake guide, and some of the rake teeth, showing the latter in two different positions.

Referring to the said drawings, the numerals 1 designate the main supporting wheels mounted on an axle 2 which supports a framework 3. In Fig. 3 the wheels 1' and their axle 2' are at the rear extremity of the framework 3, which construction I sometimes employ, but I prefer generally to mount the axle 2 at about the longitudinal center of the framework 3 as shown in Fig. 2. Said framework comprises side bars suitably connected by cross bars 4, and a tongue 5 projects forward from the framework and carries a hook or clevis 6 which is adapted for connection with the rear axle or rack of a hay wagon in the usual manner whereby the loader is dragged behind the hay wagon to raise the hay from the ground and pass it into such wagon as is customary in machines of this character. The framework supports uprights 7 at its front end; and one of the main wheels 1 carries a sprocket 8 on the inner side of its hub.

The numeral 10 designates the carrier frame comprising side bars connected by suitable cross bars in the usual manner, and across the lower end of this frame is journaled a shaft 11 carrying a sprocket 12 connected by a belt 13 with the driving sprocket 8. Hangers 14 from the framework 3 pivotally support this shaft and hence the lower end of the carrier. Across the upper end of the carrier frame is journaled a shaft 15, and on each of the shafts 11 and 15 are mounted two or more wheels 16 which are connected in pairs by belts 17, and the latter are in turn connected by slats 18—thus forming an endless carrier inclining forward and upward and driven from the main supporting wheels. The angle of inclination, and hence the height of the front end of said carrier and its point of delivery, is adjusted by the following means; On one end of the upper shaft 15 is a friction wheel 20 having on its periphery teeth or rubber, and 21 is a similar friction wheel adapted to make contact therewith. The latter wheel is mounted on a stub shaft 22 supported by a lever 23, which shaft also carries a small wheel 24; and the latter is connected by a belt 25 with a larger wheel 26 journaled on a shaft 27 which forms the pivot of said lever and stands just forward of the upright 7. This shaft 27 carries a drum 28 around which is wound a chain 29 which leads up and is connected with the upper end of the upright 7. Thus when the free end or handle of the lever 23 is raised, the wheels 20 and 21 make frictional contact and the continued revolution of the elevator shaft 15 and hence of these wheels turns the shaft 27 and drum 28, and thereby winds the chain 29 and raises the forward end of the elevator frame. A pin 26' may be inserted in one of a number of holes 27' in the upright 7; or any other suitable means may be employed for holding the front end of the elevator frame in its adjusted position after the friction wheels 20 and 21 are moved out of contact with each other.

While the elevator belts 17 may be connected in part by the ordinary slats 18, I prefer that the slats (or some of them) 30 shall be pivoted to said belts and shall carry outward projecting teeth 31 in their bodies and at their centers trailing arms 32, which latter travel upon a track 33 carried by the elevator frame. At the lower end of this track a curved guide 34 forms an extension thereof and passes around to the rear of and beneath the lower elevator shaft 11, terminating at 35 at a point slightly above said lower shaft; and the upper end of the track 33 terminates at a point slightly below the upper elevator shaft 15. With this construction, as the slats ascend at the upper side of the elevator the trailing arms 32 will travel on the track 33 and hold the teeth 31 projecting rigidly from and at right angles to the elevator belt so as to properly engage the hay being raised thereby. On reaching the upper end of the elevator, the arms 32 drop off the track and permit the teeth to swing freely so that the hay will be easily discharged without hanging on the teeth and clogging the elevator in any way. The pivoted slats then pass around the upper elevator wheels 16 and above a guide 35', whence they pass back to the lower elevator wheels and are permitted to swing freely on their pivots. On again reaching the lower end of the elevator, the trailing arms 32 strike the guide 34 at the point 35 and the teeth 31 are again held rigidly at right angles to the face of the belt while they pass around the lower shaft. Depending from said guide 35' at a point forward of the uprights 7 is a hanger 36 which supports an apron 37 whose function is to prevent wind blowing under or through the hay wagon and upward through the elevator so as to scatter the hay therefrom.

38 is a cover as of canvas or slats which I sometimes employ, and this cover may be supported by supports 39 at a suitable distance above and parallel with the upper side of the elevator to further prevent the scattering of hay therefrom.

The rake which I preferably employ in connection with this hay loader is constructed as follows:

40 is a head supported at its extremities by arms 41 which are pivoted at their inner ends to the framework 3 at points 42 near the axle 2; and 43 are the teeth which project first upward from this head, pass through eyes 44 supported on a cross bar 45 at a point directly above the lower elevator shaft 11, bend downward and rearward as at 46, and extend thence behind, around, and beneath the lower end of the elevator to their points 47, about as shown in Figs. 2 and 3.

48 is a hand-lever connected by a rod 49 with a bell crank lever 50, and 51 is another rod connecting the other arm of said bell crank lever with the rake head 40; by which construction the adjustment of the hand-lever 48 raises and lowers the rake head 40 and slides the teeth through the eyes 44 so as to raise or lower their points 47 to the proper height from the ground. At the same time, should an obstruction be struck, the points 47 will be deflected to the rear as indicated in dotted lines in Fig. 3 and the teeth will not be broken.

60 is a knife carried by each tooth just beneath its bend 46, the cutting edge of this knife standing above the tooth so that any hay which may pass behind and around the tooth will be cut when it reaches this knife and will not clog in the bend 46, but will pass up the elevator as desired.

The operation of this improved hay loader is as follows: Having attached the hook 6 to the rear axle of a hay wagon, the forward end of the elevator is adjusted to the proper height in the manner set forth above and the teeth are also adjusted by the hand-lever 48 so as to travel at the proper distance above the ground. The driver then starts the team to move the wagon forward, and the forward revolution of the main wheels 1 causes the elevator to travel in the direction indicated by the arrow. The points 47 of the teeth take up the hay and their bodies pass it around behind and press it against the lower wheels of the elevator, at which time the teeth 31 on the elevator-slats embed in the hay and carry it upward from the rake teeth as will be clear. Straggling ends which might pass behind the rake teeth are cut by the knives 60 and allowed to fall onto the elevator; and here the teeth 31 are held in rigid positions so as to engage the hay to the best advantage. On reaching the upper end of the elevator each trailing arm 32 drops off the upper end of the track 33 and permits its pivoted slat and teeth to swing entirely free, so that the hay can be easily discharged into the hay wagon in a manner which will be readily understood by those familiar with this art. Should a bunch of hay larger than usual be encountered the teeth will spring back and permit it to pass around the elevator until it reaches a point above the rake head 40 when the teeth will rise from support 45 pivoting from rake head 40, thus affording additional room and at the same time permitting the teeth to regain their proper position with reference to the lower end of the elevator.

The parts of this machine are of the desired sizes, shapes, materials, and proportions, and considerable change may be made in the exact details of construction without departing from the principle of my invention. As before stated, the use of the apron 37 and cover 38 is entirely optional. The elevator-slats need not all be pivoted nor the trailing arms and track employed unless desirable. The specific form of device for raising and lowering the front end of the elevator is not essentially useful in connection with the remaining mechanism; and also the exact means for adjusting the rake teeth, as well as the knives 60 are features which may or may not be employed as desired; but I prefer to embody the several features herein set forth in a single machine—with, possibly, trivial exceptions and deviations—for the reason that I consider the whole as thus constructed an economical and useful hay loader of the pattern set forth, not liable to get out of order, and easy of operation.

What is claimed as new is—

1. In a hay loader, the combination with a main framework carrying an upright at its forward end, an elevator frame pivoted near the rear end of the framework and inclining forward, shafts across the ends of said frame, and an endless apron moving around said shafts; of a friction wheel mounted on the upper elevator shaft, a lever pivoted at one extremity to the elevator frame, a friction wheel mounted on a stub shaft in said lever and adapted to contact with the friction wheel on the elevator shaft, a drum journaled on the pivot of said lever, connections between said drum and the friction wheel of the lever, and a chain leading from the drum to the upper end of said upright, as and for the purpose set forth.

2. In a hay loader, the combination with a main framework carrying an upright at its forward end, an elevator frame pivoted near the rear end of the framework and inclining forward, shafts across the ends of said frame, and an endless apron moving around said shafts; of a friction wheel mounted on the upper elevator shaft, a lever pivoted at one extremity to the elevator frame at a point below said friction wheel, a stub shaft carried by the lever, a friction wheel journaled on this shaft and adapted to contact with that on the elevator shaft, a drum journaled on the pivot of the lever, a chain wound on the drum and connected with the upright, a large wheel secured to the drum, a small wheel secured to the friction wheel on the lever, and belt connecting these two wheels, as and for the purpose set forth.

3. In a hay loader, the combination with a main framework carrying an upright at its forward end, an elevator frame pivoted near the rear end of the framework and inclining forward, shafts across the ends of said frame, and an endless apron moving around said shafts; of a friction wheel mounted on the upper elevator shaft, a lever pivoted at one extremity to the elevator frame, a friction wheel mounted on a stub shaft in said lever and adapted to contact with the friction wheel on the elevator shaft, a drum journaled on the pivot of said lever, connections between said drum and the upright, connections between the drum and the friction wheel on the lever for the purpose set forth, and means for rigidly supporting the front end of the elevator, substantially as described.

4. In a hay loader, the combination with a framework, and a forwardly inclined endless elevator; of a rake consisting of a rake head, arms supporting said head and pivoted to the framework, means for raising and lowering the head, a cross bar rigidly supported forward of and above said head, eyes in said cross bar, and rake teeth projecting from the head forward through said eyes and then curving to the rear and extending behind and beneath said elevator, as and for the purpose set forth.

5. In a hay loader, the combination with a framework, and a forwardly inclined endless elevator; of a rake consisting of a rake head, arms supporting said head and pivoted to the framework, rake teeth carried by said head and extending behind and beneath the elevator, a bell crank lever pivoted to the framework, a rod connecting one arm of this lever with the rake head, a hand-lever also mounted on the framework, and a second rod connecting this lever with the other arm of the bell crank lever, as and for the purpose set forth.

6. In a hay loader, the combination with a framework, and a forwardly inclined endless elevator; of a rake comprising a rake head adjustably supported by the framework, teeth projecting from said head forward and then bending to the rear and extending behind and beneath said elevator, and a knife mounted on each tooth with its edge projecting away from the elevator, as and for the purpose set forth.

In testimony whereof I affix my signature in presence of two witnesses.

ABRAHAM LINCOLN RICE.

Witnesses:
JOHN O. MALCOLM,
LIDA L. DODDS.